(12) United States Patent
Li et al.

(10) Patent No.: US 8,482,707 B2
(45) Date of Patent: Jul. 9, 2013

(54) LIQUID CRYSTAL DISPLAY PANEL

(75) Inventors: Ming-Chun Li, Taichung (TW);
Ying-Chi Lu, Taoyuam County (TW);
Seok-Lyul Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 251 days.

(21) Appl. No.: 13/005,543

(22) Filed: Jan. 13, 2011

(65) Prior Publication Data
US 2012/0086897 A1    Apr. 12, 2012

(30) Foreign Application Priority Data
Oct. 11, 2010   (TW) ............................... 99134605 A

(51) Int. Cl.
*G02F 1/1337*    (2006.01)

(52) U.S. Cl.
USPC ........................................................ 349/123

(58) Field of Classification Search
None
See application file for complete search history.

(56) References Cited

U.S. PATENT DOCUMENTS

| | | | |
|---|---|---|---|
| 6,583,840 B1 | 6/2003 | Inoue et al. | |
| 8,294,851 B2 * | 10/2012 | Chan et al. | 349/93 |
| 2003/0002002 A1 * | 1/2003 | Kawachi et al. | 349/143 |
| 2006/0001809 A1 * | 1/2006 | Lee et al. | 349/128 |
| 2007/0070282 A1 | 3/2007 | Shibahara et al. | |
| 2008/0106689 A1 * | 5/2008 | Inoue et al. | 349/181 |
| 2009/0141215 A1 | 6/2009 | Bremer et al. | |
| 2009/0322659 A1 * | 12/2009 | Chan et al. | 345/87 |
| 2010/0240273 A1 * | 9/2010 | Chan et al. | 445/24 |
| 2011/0001917 A1 * | 1/2011 | Araya et al. | 349/183 |

FOREIGN PATENT DOCUMENTS

| | | |
|---|---|---|
| CN | 101144953 | 3/2008 |
| CN | 101738792 | 6/2010 |
| TW | 587191 | 5/2004 |
| TW | 200532289 | 10/2005 |

OTHER PUBLICATIONS

"First Office Action of China Counterpart Application", issued on Oct. 19, 2011, p. 1-p. 5, in which the listed references were cited.

* cited by examiner

*Primary Examiner* — Sung Pak
(74) *Attorney, Agent, or Firm* — Jianq Chyun IP Office

(57) ABSTRACT

A liquid crystal display (LCD) panel includes a first substrate, a second substrate, a polymer stabilized alignment (PSA) liquid crystal layer, a first alignment layer, a second alignment layer, and a plurality of pixel structures. The PSA liquid crystal layer is configured between the first and second substrates, and liquid crystal molecules of the PSA liquid crystal layer are substantially arranged in parallel to the first and second substrates. The first alignment layer is configured between the first substrate and the PSA liquid crystal layer and has a first alignment direction. The second alignment layer is configured between the second substrate and the PSA liquid crystal layer. Each pixel structure is configured between the second substrate and the second alignment layer and has a pixel electrode and a first common electrode. The pixel electrode has at least one slit which is overlapped with the first common electrode.

13 Claims, 10 Drawing Sheets

LIQUID CRYSTAL DISPLAY PANEL

CROSS-REFERENCE TO RELATED APPLICATION

This application claims the priority benefit of Taiwan application serial no. 99134605, filed on Oct. 11, 2010. The entirety of the above-mentioned patent application is hereby incorporated by reference herein and made a part of this specification.

BACKGROUND OF THE INVENTION

1. Field of the Invention

The invention relates to a liquid crystal display (LCD) panel. More particularly, the invention relates to an LCD panel that is characterized by wide viewing angle, and liquid crystal molecules of the LCD panel are arranged in parallel to a substrate in the LCD panel.

2. Description of Related Art

Nowadays, a thin film transistor liquid crystal display (TFT-LCD) panel on the market is required to have high contrast ratio, high luminance, high response speed, and wide viewing angle. Currently, several types of display panels can meet the requirement of wide viewing angles, such as an in-plane switching (IPS) LCD panel, a fringe field switching (FFS) LCD panel, a multi-domain vertical alignment (MVA) LCD panel, and so on.

In a conventional MVA LCD panel, alignment protrusions or slits are configured at respective sides of a liquid crystal layer, such that liquid crystal molecules are arranged in a multi-directional manner, and that several alignment domains are obtained to achieve the wide viewing angle display effect. A transmittance-level curve showing the correlation between the transmittance rate and the gray-scale level of the MVA LCD panel still has the curvature that is varied together with the changing viewing angle. That is to say, when the viewing angle is altered, display luminance of the MVA LCD panel is changed, which results in color shift and color washout.

In comparison with the liquid crystal molecules in the MVA LCD panel, the liquid crystal molecules in the IPS LCD panel and in the FFS LCD panel are arranged in parallel to the substrate, such that the index of refraction at different viewing angles remains unchanged. As such, the defects of color shift and color washout are not apt to exist in the IPS LCD panel and in the FFS LCD panel.

SUMMARY OF THE INVENTION

The invention is directed to an LCD panel that achieves a wide viewing angle display effect by means of liquid crystal molecules arranged in parallel to a substrate. Further, the liquid crystal molecules in parallel to the substrate can have fast response speed and desirable efficiency.

The invention provides an LCD panel that includes a first substrate, a second substrate, a polymer stabilized alignment (PSA) liquid crystal layer, a first alignment layer, a second alignment layer, and a plurality of pixel structures. The second substrate is opposite to the first substrate. The PSA liquid crystal layer is configured between the first substrate and the second substrate, and liquid crystal molecules of the PSA liquid crystal layer are substantially arranged in parallel to the first substrate and the second substrate. The first alignment layer is configured between the PSA liquid crystal layer and the first substrate, and the first alignment layer has a first alignment direction to align the liquid crystal molecules of the PSA liquid crystal layer. The second alignment layer is configured between the PSA liquid crystal layer and the second substrate. Each of the pixel structures has a pixel electrode and a first common electrode. The pixel electrode is configured between the second substrate and the second alignment layer, and the pixel electrode has at least one slit. The first common electrode is configured between the second substrate and the second alignment layer, and the first common electrode is overlapped with the at least one slit.

According to an embodiment of the invention, the liquid crystal molecules of the PSA liquid crystal layer are negative PSA liquid crystal molecules.

According to an embodiment of the invention, an included angle between the first alignment direction of the first alignment layer and a vertical direction of the at least one slit ranges from about 0 degree to about 20 degrees. Besides, a second alignment direction of the second alignment layer is substantially parallel to the first alignment direction of the first alignment layer, for instance.

According to an embodiment of the invention, an included angle between the first alignment direction of the first alignment layer and a vertical direction of the at least one slit is about 10 degrees. Besides, a second alignment direction of the second alignment layer is substantially parallel to the first alignment direction of the first alignment layer, for instance.

According to an embodiment of the invention, the LCD panel further includes a second common electrode that is configured between the first substrate and the first alignment layer. Specifically, the LCD panel can further include a planarization layer that is configured between the first substrate and the PSA liquid crystal layer. According to an embodiment of the invention, the second common electrode is located between the planarization layer and the first substrate.

According to an embodiment of the invention, each of the pixel structures further includes an active device that is configured on the second substrate, and the pixel electrode is electrically connected to the active device.

According to an embodiment of the invention, the first common electrode is configured below the pixel electrode, located between the pixel electrode and the second substrate, and electrically insulated from the pixel electrode. According to an embodiment of the invention, the first common electrode of each of the pixel structures includes at least one bar-shaped portion, and each of the bar-shaped portions is located below one of the slits. Additionally, the LCD panel further includes an insulating layer that is configured on the second substrate and located between the first common electrode and the pixel electrode, for instance.

According to an embodiment of the invention, the first common electrode and the pixel electrode are substantially co-planar. The first common electrode of each of the pixel structures includes at least one bar-shaped portion, and each of the bar-shaped portions is located in one of the slits.

Based on the above, the PSA liquid crystal layer formed by applying a PSA method has the liquid crystal molecules that are arranged in parallel to the substrates in the invention. No matter the LCD panel is in a display state or in a non-display state, the liquid crystal molecules can be stably arranged in parallel to the substrates. Moreover, the alignment layers in the LCD panel can have alignment directions, such that the liquid crystal molecules arranged in parallel to the substrates can have fast response speed and desirable efficiency.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 1A is a schematic cross-sectional view illustrating a portion of an LCD panel according to a first embodiment of the invention, while

FIG. 6A is a schematic cross-sectional view illustrating a portion of an LCD panel according to a sixth embodiment of the invention, while

DESCRIPTION OF EMBODIMENTS

Figure 1A:
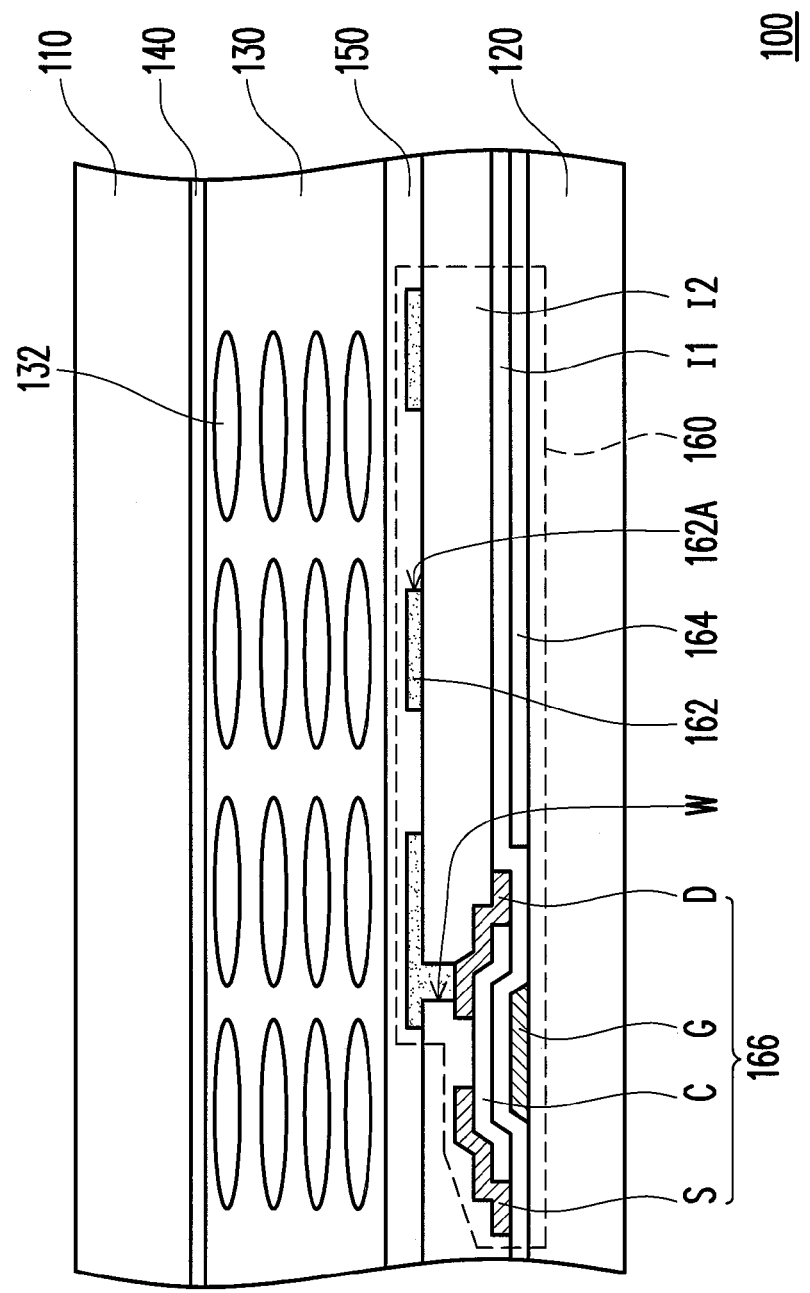
Figure 1B:
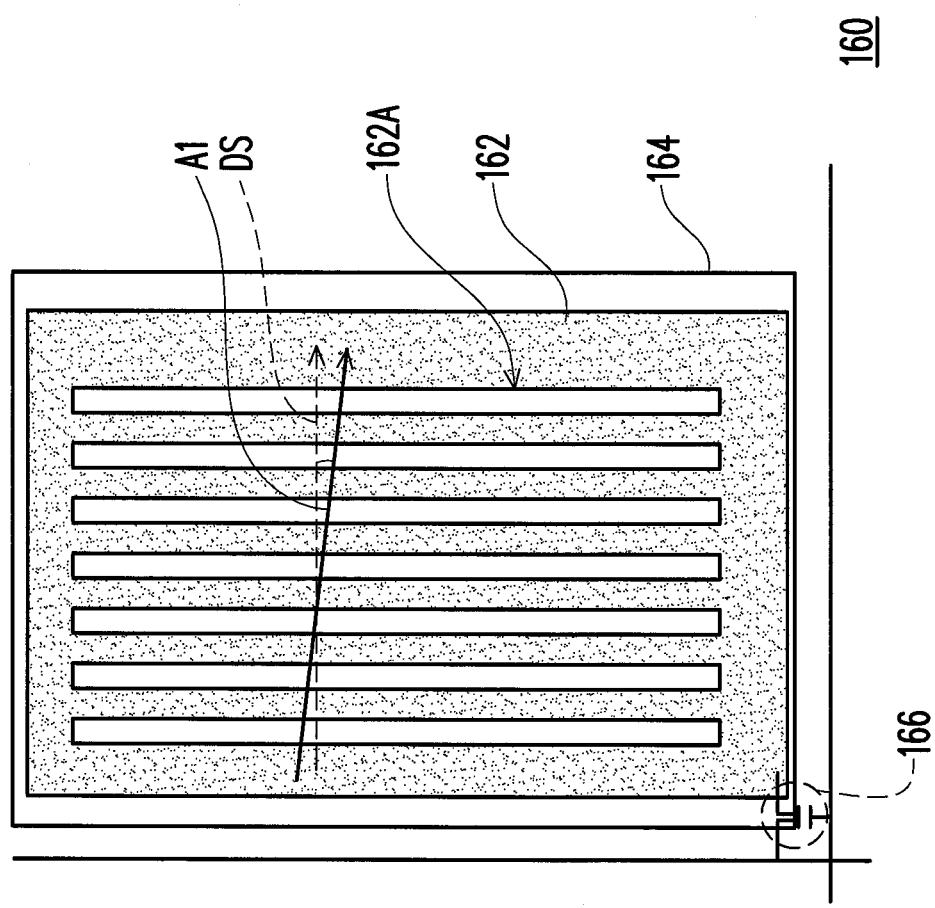
FIG. 1B is a schematic top view illustrating an individual pixel structure in the LCD panel depicted in FIG. 1A.

FIG. 1A is a schematic cross-sectional view illustrating a portion of an LCD panel according to a first embodiment of the invention, while FIG. 1B is a schematic top view illustrating an individual pixel structure in the LCD panel depicted in FIG. 1A. With reference to FIG. 1A and FIG. 1B, the LCD panel 100 includes a first substrate 110, a second substrate 120, a PSA liquid crystal layer 130, a first alignment layer 140, a second alignment layer 150, and a plurality of pixel structures 160. Here, only one of the pixel structures 160 is illustrated for explanation, while the number of the pixel structures 160 is plural in the actual design of the LCD panel 100.

The second substrate 120 is opposite to the first substrate 110 in this embodiment. The PSA liquid crystal layer 130 is configured between the first substrate 110 and the second substrate 120, and liquid crystal molecules 132 of the PSA liquid crystal layer 130 are substantially arranged in parallel to the first substrate 110 and the second substrate 120. The first alignment layer 140 is configured between the PSA liquid crystal layer 130 and the first substrate 110. The second alignment layer 150 is configured between the PSA liquid crystal layer 130 and the second substrate 120. The pixel structure 160 is configured on the second substrate 120 and located between the second substrate 120 and the second alignment layer 150.

In particular, during fabrication of the LCD panel 100, a PSA process can be performed to form the PSA liquid crystal layer 130. That is to say, in the method of fabricating the LCD panel 100, the liquid crystal molecules 132 and reactive monomers (not shown) are mixed, and the space between the first substrate 110 and the second substrate 120 is filled with the mixture. An electric field is applied to the liquid crystal molecules 132, such that the liquid crystal molecules 132 are parallel to the first substrate 110 and the second substrate 120. The liquid crystal molecules 132 parallel to the first substrate 110 and the second substrate 120 are irradiated by rays (e.g., ultraviolet light or light with a specific wavelength). Under irradiation, the reactive monomers (not shown) are bonded to the first alignment layer 140 and the second alignment layer 150 that are located at respective sides of the LCD panel 100. The electric field is then removed, and the PSA process is completed.

Here, the first alignment layer 140 and the second alignment layer 150 can provide the liquid crystal molecules 132 with a stable alignment force, such that the liquid crystal molecules 132 are arranged in parallel to the first substrate 110 and the second substrate 120. Hence, no matter the LCD panel 100 is in a display state or not, the liquid crystal molecules 132 are arranged in parallel to the first substrate 110 and the second substrate 120.

In detail, each of the pixel structures 160 includes a pixel electrode 162, a first common electrode 164, and an active device 166. The pixel electrode 162 in this embodiment has at least one slit 162A. The active device 166 includes a gate G, a channel layer C, a source S, and a drain D. The channel layer C is configured above the gate G, and the source S and the drain D are configured on the channel layer C and located at respective sides of the gate G. The LCD panel 100 can further include a first insulating layer I1 and a second insulating layer I2. The first insulating layer I1 covers the gate G and the first common electrode 164 and is located between the pixel electrode 162 and the first common electrode 164. The second insulating layer I2 covers the active device 166, and the pixel electrode 162 can be electrically connected to the drain D of the active device 166 through a contact window W in the second insulating layer I2.

The pixel structure 160 of this embodiment is an actively driven pixel structure, for instance, while the pixel structure 160 can also be passively driven in other embodiments of the invention, given the pixel structure 160 does not contain the active device 166. That is to say, the active device 166 of the pixel structure 160 is optional and should not be construed as a limitation to this invention.

As shown in FIG. 1B, the first common electrode 164 is overlapped with at least one slit 162A, and therefore the slit 162A exposes the first common electrode 164. When the LCD panel 100 is in the display state, different voltages can be applied to the pixel electrode 162 and the first common electrode 164, respectively. Hence, the pixel electrode 162 and the first common electrode 164 can provide a lateral electric field to change the arrangement direction of the liquid crystal molecules 132 for achieving the required gray level of the display image. Said design is also named as a fringe field switching LCD panel.

In this embodiment, the first alignment layer 140 can have a first alignment direction A1 in which the liquid crystal molecules 132 of the PSA liquid crystal layer 130 are substantially aligned. The liquid crystal molecules 132 are negative PSA liquid crystal molecules, for instance and the major axis of the liquid crystal molecules 132 is substantially perpendicular to a direction of the electric field in the LCD panel 100. With the layout of the slit 162A, the direction of the electric field in the LCD panel 100 is substantially parallel to a vertical direction DS of the slit 162A. Therefore, an included angle between the first alignment direction A1 and the vertical direction DS ranges from about 0 degree to about 20 degrees. Preferably, the included angle between the first alignment direction A1 and the vertical direction DS is about 10 degrees, so as to ensure the fast response speed of the liquid crystal molecules 132.

In other embodiments of the invention, the second alignment layer 150 can selectively have a second alignment direction (not shown) parallel to the first alignment direction A1, such that the liquid crystal molecules 132 are stably aligned along the first direction A1. The way to define the alignment direction of the alignment layer is not specifically limited in this embodiment. For example, rubbing alignment or photo-alignment are both applicable.

Figure 2:
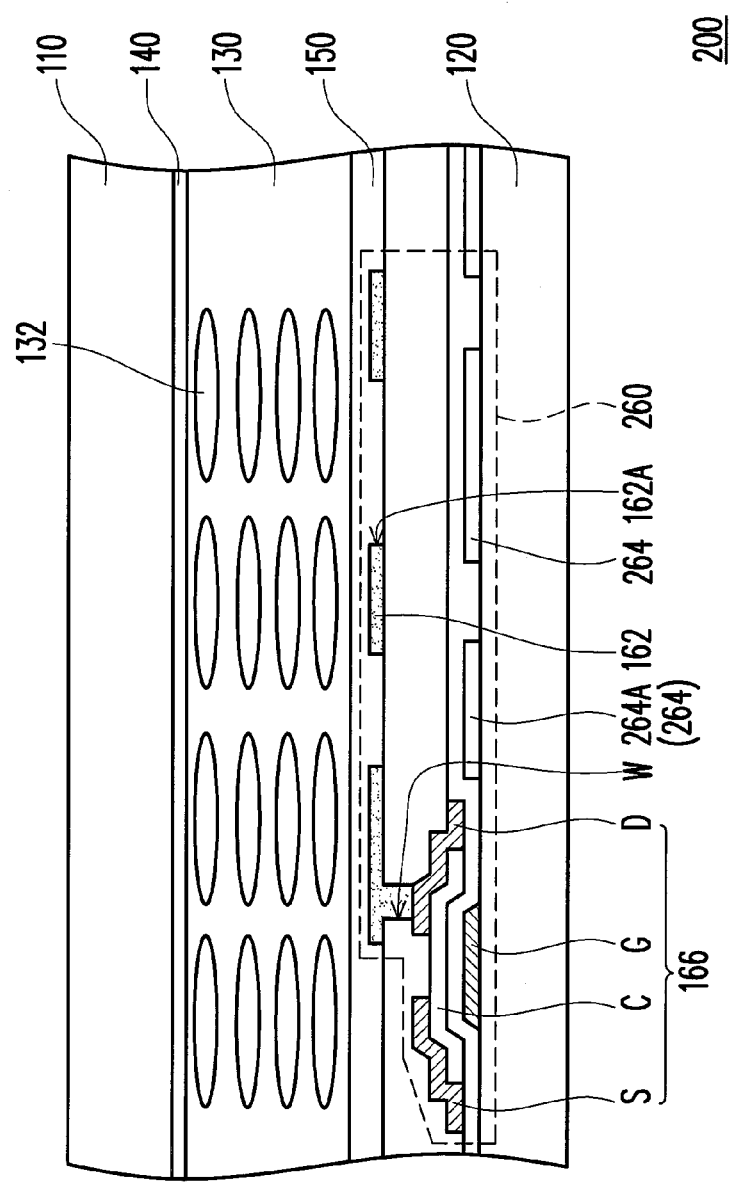
FIG. 2 is a schematic cross-sectional view illustrating a portion of an LCD panel according to a second embodiment of the invention.

In said embodiment, the area occupied by the first common electrode 164 substantially identical to the display area of the entire pixel structure 160 is exemplarily described, while the invention is not limited thereto. FIG. 2 is a schematic cross-sectional view illustrating a portion of an LCD panel according to a second embodiment of the invention. With reference to FIG. 2, the LCD panel 200 includes a first substrate 110, a second substrate 120, a PSA liquid crystal layer 130, a first alignment layer 140, a second alignment layer 150, and a pixel structure 260. The relative correlation of these components can be learned from the explanation in the previous embodiment, and therefore no other descriptions are provided herein. The main difference between the LCD panel 100 and the LCD panel 200 of this embodiment lies in that the first common electrode 264 of the pixel structure 260 has a specific pattern and is made of at least one bar-shaped portion 264A. Each of the bar-shaped portions 264A is located below one of the slits 162A.

During fabrication of the LCD panel 200 in this embodiment, a PSA process can be performed, such that the liquid crystal molecules 132 of the PSA liquid crystal layer 130 can be arranged in parallel to the first substrate 110 and the second substrate 120. In addition, the alignment direction of the first alignment layer 140 is conducive to an increase in the response speed of the liquid crystal molecules 132, such that the LCD panel 200 can have favorable display performance. The second alignment layer 150 of this embodiment can certainly have an alignment direction as well. When the second alignment layer 150 also has the alignment direction, the alignment directions of the two alignment layers 140 and 150 are parallel to each other.

Figure 3:
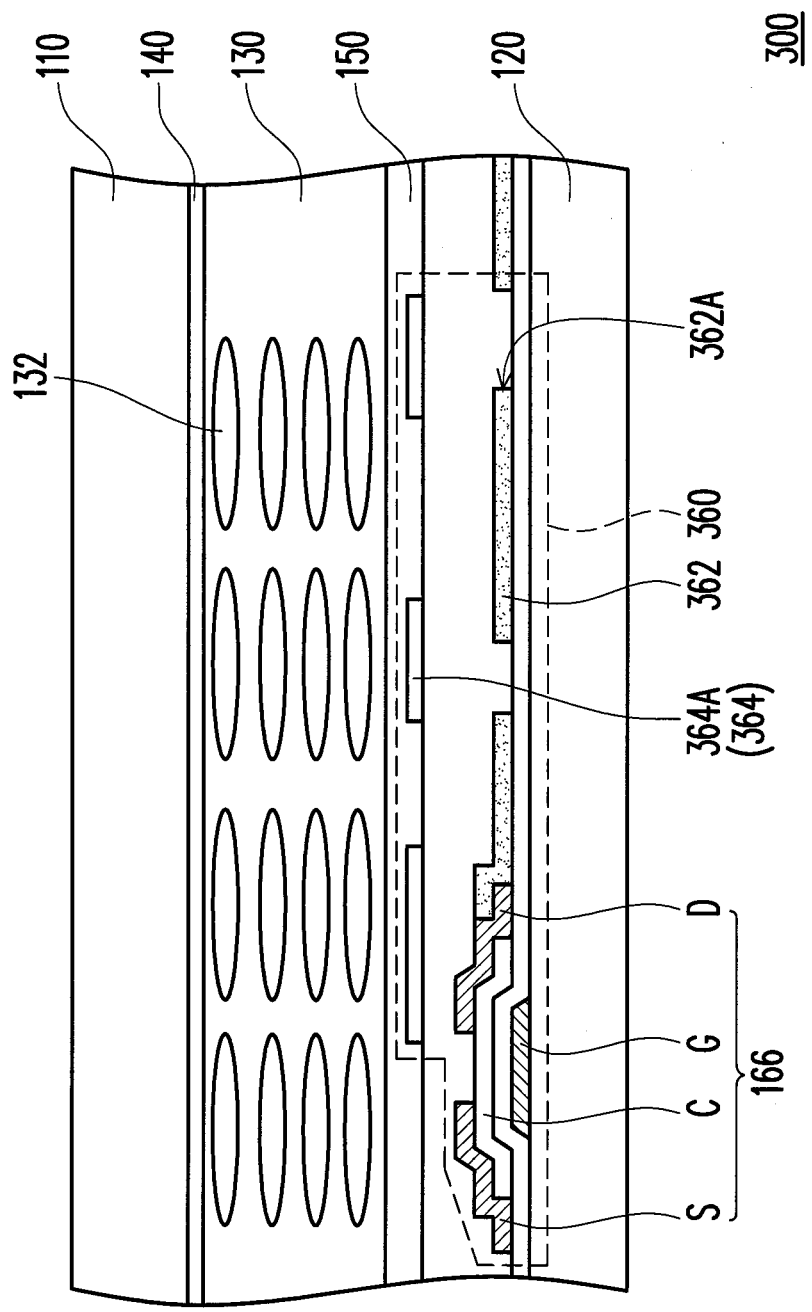
FIG. 3 is a schematic cross-sectional view illustrating a portion of an LCD panel according to a third embodiment of the invention.

To be more specific, the layout of the pixel structure can be embodied in various ways. FIG. 3 is a schematic cross-sectional view illustrating a portion of an LCD panel according to a third embodiment of the invention. With reference to FIG. 3, the LCD panel 300 includes a first substrate 110, a second substrate 120, a PSA liquid crystal layer 130, a first alignment layer 140, a second alignment layer 150, and a pixel structure 360. The relative correlation of these components can be learned from the explanation in the first embodiment, and therefore no other descriptions are provided herein. The main difference between the LCD panel 300 of this embodiment and the LCD panel 100 of the first embodiment lies in that the pixel electrode 362 in the pixel structure 360 is located between the first common electrode 364 and the second substrate 120 and has a plurality of slits 362A. Besides, the first common electrode 364 is formed by a plurality of bar-shaped portions 364A. A portion of the pixel electrode 362 is exposed by a gap between the adjacent bar-shaped portions 364A. The bar-shaped portions 364A of the first common electrode 364 are located above the slits 362A to generate the fringe electric field effect.

Similar to the previous embodiment, in this embodiment, the PSA process can be performed to form the PSA liquid crystal layer 130, such that the liquid crystal molecules 132 of the PSA liquid crystal layer 130 can be arranged in parallel to the first substrate 110 and the second substrate 120. Besides, the first alignment layer 140 can provide the liquid crystal molecules 132 with a stable alignment force, such that the liquid crystal molecules 132 can have fast response speed, and that the display performance of the LCD panel 300 can be improved.

Figure 4:
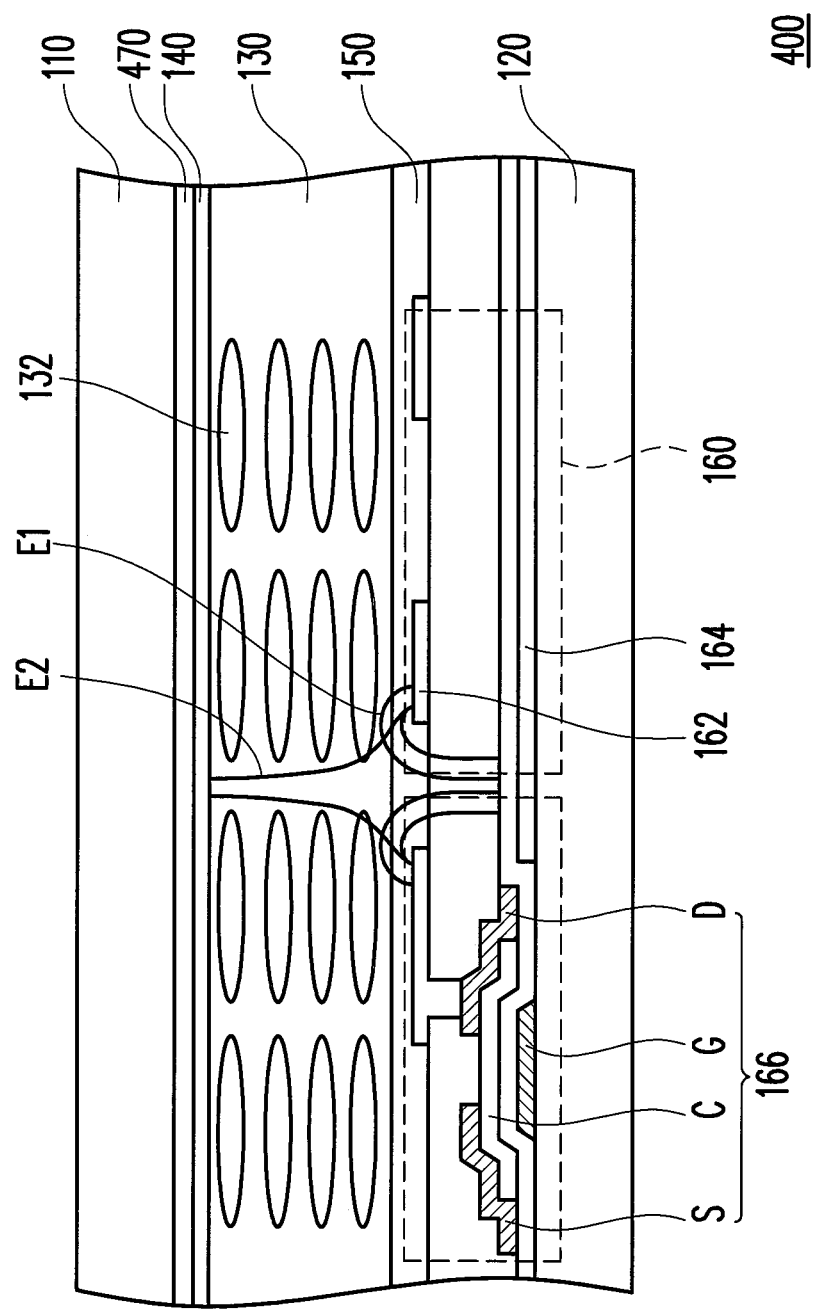
FIG. 4 is a schematic cross-sectional view illustrating a portion of an LCD panel according to a fourth embodiment of the invention.

FIG. 4 is a schematic cross-sectional view illustrating a portion of an LCD panel according to a fourth embodiment of the invention. With reference to FIG. 4, the LCD panel 400 includes a first substrate 110, a second substrate 120, a PSA liquid crystal layer 130, a first alignment layer 140, a second alignment layer 150, a pixel structure 160, and a second common electrode 470. The arrangement of the first substrate 110, the second substrate 120, the PSA liquid crystal layer 130, the first alignment layer 140, the second alignment layer 150, and the pixel structure 160 can refer to the arrangement described in the first embodiment, in the second embodiment, or in the third embodiment. The main difference between this embodiment and the previous embodiments lies in that the second common electrode 470 is further configured on the first substrate 110.

When the LCD panel 400 of this embodiment is in the display state, a first electric field E1 is generated between the pixel electrode 162 and the first common electrode 164, and a second electric field E2 is further generated between the pixel electrode 162 and the second common electrode 470. When the first and the second electric fields E1 and E2 are both applied, the liquid crystal molecules 132 of the PSA liquid crystal layer 130 which are parallel to the first and the second substrates 110 and 120 can be rotated in a more stable manner, which leads to desirable liquid crystal efficiency.

Figure 5:
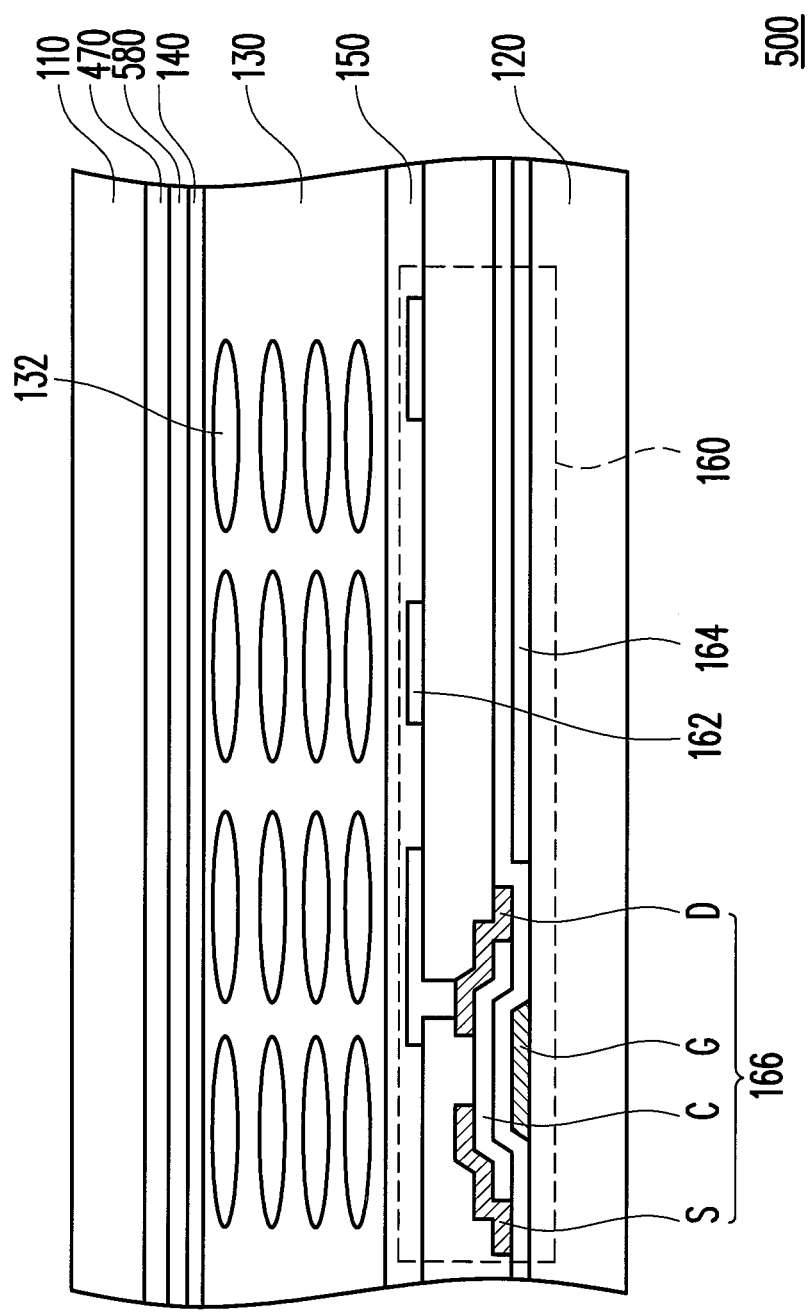
FIG. 5 is a schematic cross-sectional view illustrating a portion of an LCD panel according to a fifth embodiment of the invention.

FIG. 5 is a schematic cross-sectional view illustrating a portion of an LCD panel according to a fifth embodiment of the invention. With reference to FIG. 5, the LCD panel 500 includes a first substrate 110, a second substrate 120, a PSA liquid crystal layer 130, a first alignment layer 140, a second alignment layer 150, a pixel structure 160, a second common electrode 470, and a planarization layer 580. The arrangement of the first substrate 110, the second substrate 120, the PSA liquid crystal layer 130, the first alignment layer 140, the second alignment layer 150, the pixel structure 160, and the second common electrode 470 can refer to the arrangement described in the fourth embodiment. The main difference between this embodiment and the fourth embodiment lies in that the planarization layer 580 is further configured on the first substrate 110 and between the first substrate 110 and the PSA liquid crystal layer 130.

Specifically, the second common electrode 470 of this embodiment is configured between the planarization layer 580 and the first substrate 110. As such, the PSA liquid crystal layer 130 can have desirable liquid crystal efficiency. However, it is not necessary for the planarization layer 580 to cover the second common electrode 470 in this invention. In other embodiments of the invention, the planarization layer 580 can be selectively configured between the second common electrode 470 and the first substrate 110. Besides, to achieve the multi-color display effect, the LCD panel 500 can further include a color filter layer (not shown) which can be configured on the first substrate 110 or on the second substrate 120. Certainly, the color filter layer (not shown) can be formed in all of the previous embodiments to accomplish the multi-color display effect.

In the LCD panel 500 of this embodiment, the PSA process is performed, such that the liquid crystal molecules 132 are arranged in parallel to the first and the second substrates 110 and 120. Besides, the electric field between the pixel electrode 162 and the second common electrode 470 also contributes to driving the liquid crystal molecules 132 for display. In general, the LCD panel 500 has desirable liquid crystal efficiency, and the liquid crystal molecules 132 have fast response speed.

Figure 6A:
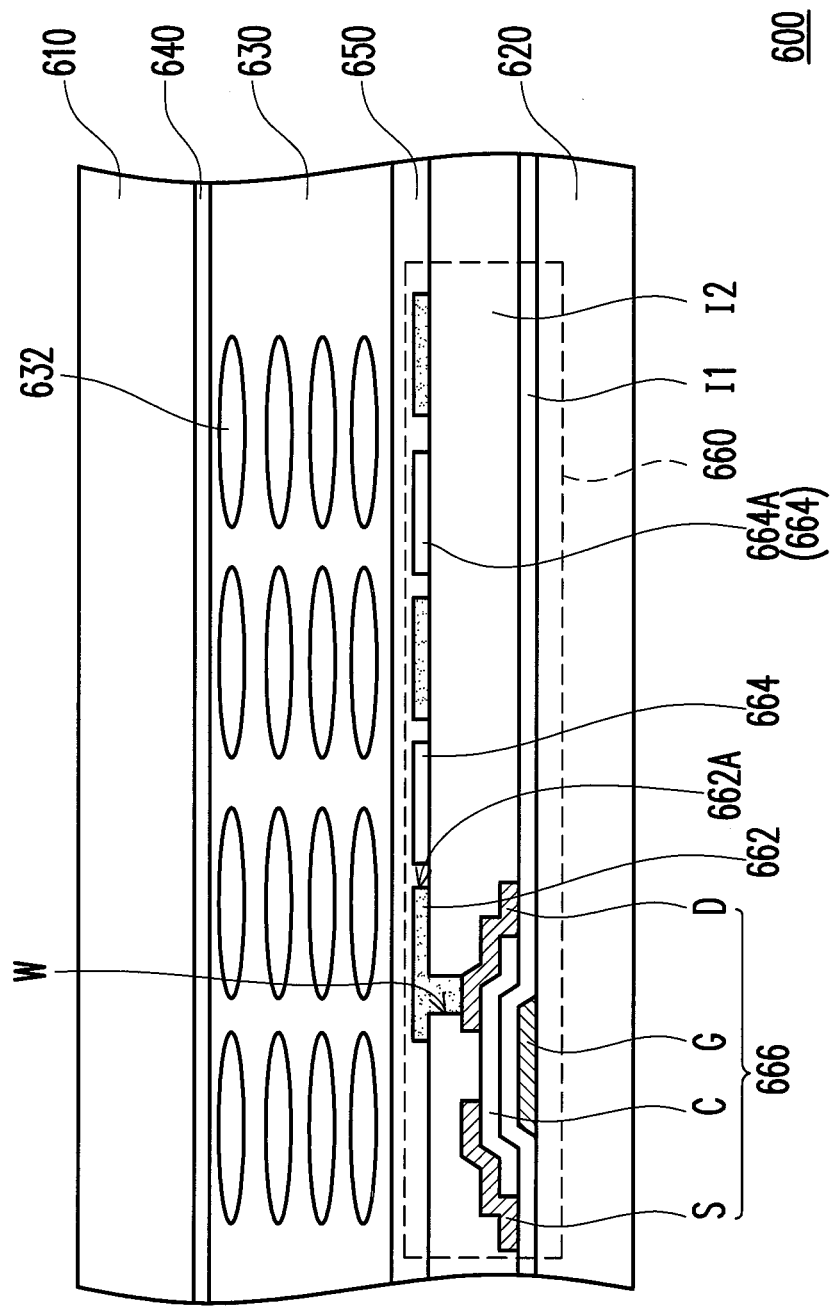
Figure 6B:
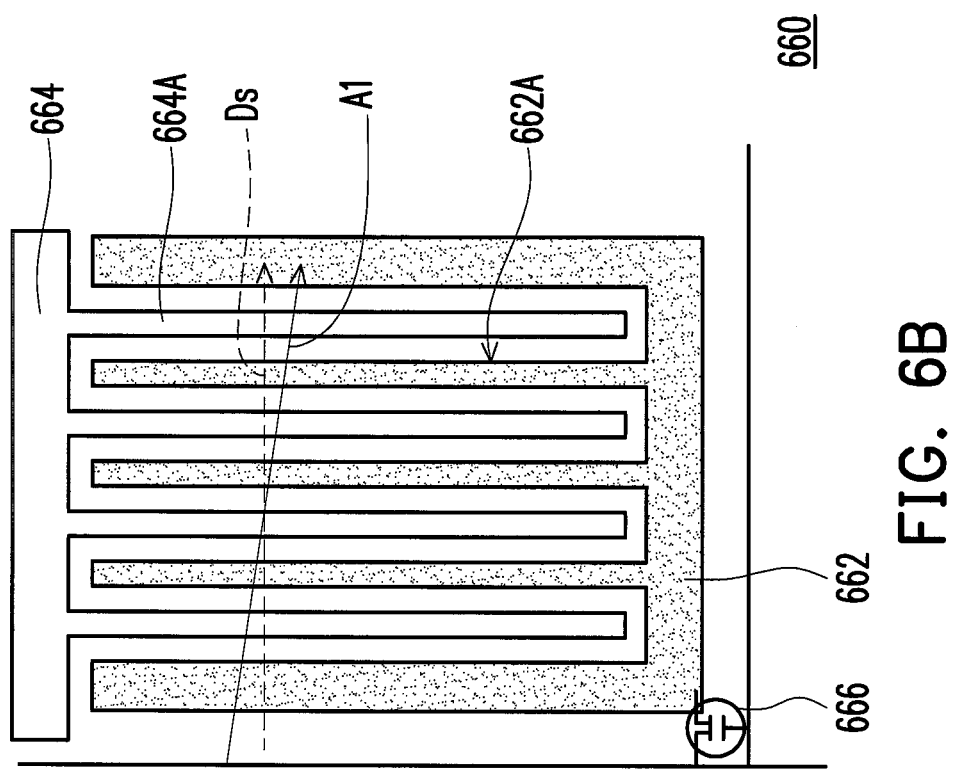
FIG. 6B is a schematic top view illustrating an individual pixel structure in the LCD panel depicted in FIG. 6A.

The design of the pixel structure is not limited to those described above. FIG. 6A is a schematic cross-sectional view illustrating a portion of an LCD panel according to a sixth embodiment of the invention, while FIG. 6B is a schematic top view illustrating an individual pixel structure in the LCD panel depicted in FIG. 6A. With reference to FIG. 6A and FIG. 6B, the LCD panel 600 includes a first substrate 610, a second substrate 620, a PSA liquid crystal layer 630, a first alignment layer 640, a second alignment layer 650, and a plurality of pixel structures 660. Here, only one of the pixel structures 660 is illustrated for explanation, while the number of the pixel structures 660 is plural in the actual design of the LCD panel 600.

The second substrate 620 is opposite to the first substrate 610 in this embodiment. The PSA liquid crystal layer 630 is configured between the first substrate 610 and the second substrate 620, and liquid crystal molecules 632 of the PSA liquid crystal layer 630 are substantially arranged in parallel to the first substrate 610 and the second substrate 620. The first alignment layer 640 is configured between the PSA liquid crystal layer 630 and the first substrate 610. The second alignment layer 650 is configured between the PSA liquid crystal layer 630 and the second substrate 620. The pixel structure 660 is configured on the second substrate 620 and located between the second substrate 620 and the second alignment layer 650.

Each of the pixel structures 660 includes a pixel electrode 662, a first common electrode 664, and an active device 666. The active device 666 includes a gate G, a channel layer C, a source S, and a drain D. The channel layer C is configured above the gate G. The source S and the drain D are configured on the channel layer C and located at respective sides of the gate G. The LCD panel 600 can further include a first insulating layer I1 and a second insulating layer I2. The first insulating layer I1 covers the gate G, and the second insulating layer I2 covers the active device 666. The pixel electrode 662 and the first common electrode 664 are both configured on the second insulating layer I2, and the pixel electrode 662 is electrically connected to the drain D of the active device 666 through a contact window W in the second insulating layer I2.

In this embodiment, the pixel electrode 662 is a comb-shaped electrode which has a plurality of slits 662A. The first common electrode 664 can also have comb-shaped patterns and at least include a plurality of bar-shaped portions 664A. Each of the bar-shaped portions 664A is located in one of the slits 662A of the pixel electrode 662. When the LCD panel 600 is in the display state, different voltages are applied to the pixel electrode 662 and the first common electrode 664, respectively. Here, since the pixel electrode 662 and the first common electrode 664 are on the same plane, an electric field parallel to the first and the second substrates 610 and 620 can be generated. The liquid crystal molecules 632 are affected by the electric field and then rotated for display. Accordingly, the LCD panel 600 can also be named as the IPS LCD panel.

Besides, the liquid crystal molecules 632 of the PSA liquid crystal layer 630, for instance, are negative PSA liquid crystal molecules that are characterized by arranging perpendicular to the direction of the electric field. Therefore, to increase the response speed of the liquid crystal molecules 632, the first alignment layer 640, for instance, has a first alignment direction A1, and an included angle between the first alignment direction A1 and a vertical direction Ds of the slits 662A ranges from about 0 degree to about 20 degrees. According to an embodiment of the invention, the included angle between the first alignment direction A1 and the vertical direction Ds can be about 10 degrees.

After the PSA process is performed, the liquid crystal molecules 632 can be arranged in parallel to the first substrate 110 and the second substrate 120, and the alignment force provided by the first alignment layer 640 allows the liquid crystal molecules 632 to be arranged along the first alignment direction A1. When the LCD panel 600 is in the display state, the liquid crystal molecules 632 can be rapidly rotated, and therefore the liquid crystal molecules 632 have fast response speed. As a result, the design described in this embodiment is conducive to improvement of display quality of the LCD panel 600. The second alignment layer 650 of this invention can certainly have a specific alignment direction as well. According to an embodiment of the invention, when the second alignment layer 650 has a second alignment direction (not shown), the second alignment direction (not shown) can be parallel to the first alignment direction A1.

Figure 7:
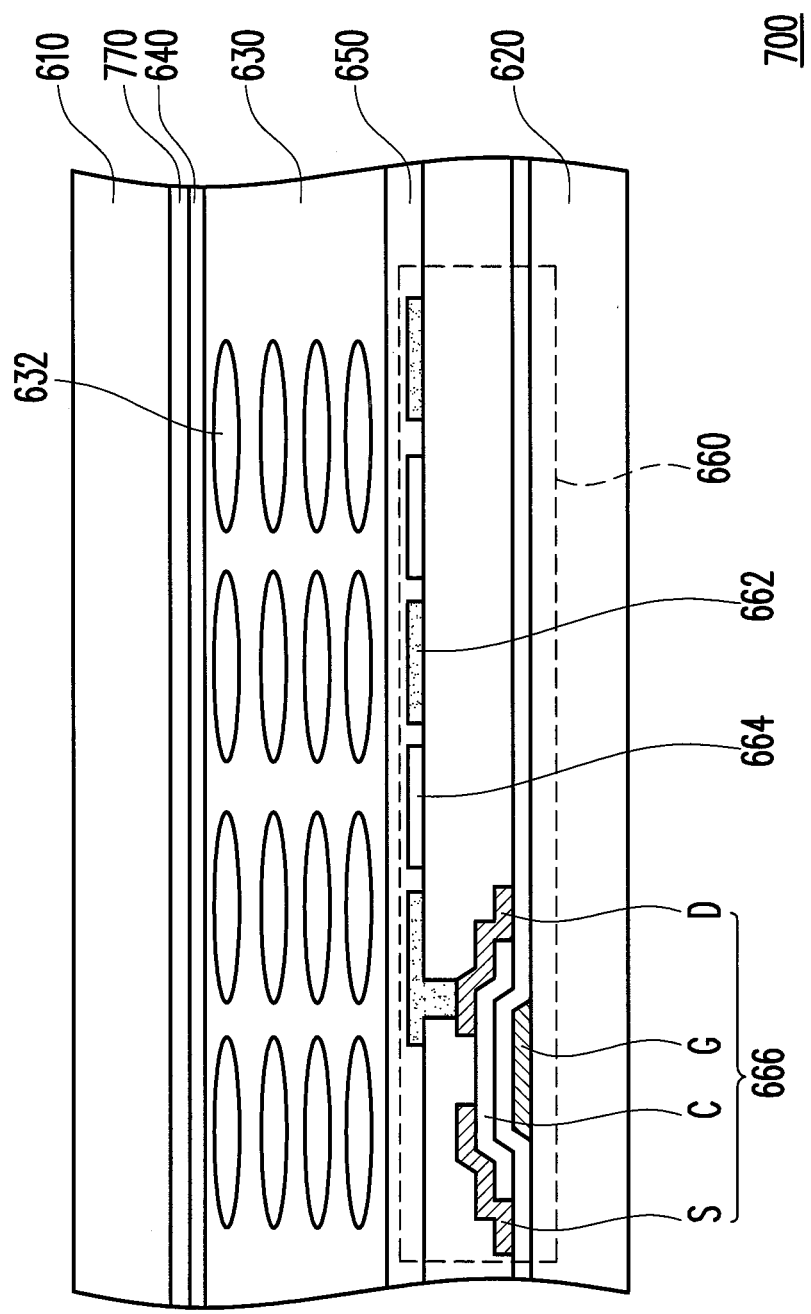
FIG. 7 is a schematic cross-sectional view illustrating a portion of an LCD panel according to a seventh embodiment of the invention.

FIG. 7 is a schematic cross-sectional view illustrating a portion of an LCD panel according to a seventh embodiment of the invention. With reference to FIG. 7, the LCD panel 700 has the components of the LCD panel 600 and further includes a second common electrode 770. The second common electrode 770 is configured on the first substrate 610 and located between the first alignment layer 640 and the first substrate 610. In this embodiment, the relative correlation of the first substrate 610, the second substrate 620, the PSA liquid crystal layer 630, the first alignment layer 640, the second alignment layer 650, and the pixel structures 660 can refer to the explanation in the sixth embodiment, and therefore no further descriptions are provided herein.

In this embodiment, the electric field between the first common electrode 664 and the pixel electrode 662 affects the arrangement of the liquid crystal molecules 632. Moreover, another electric field can be further generated by the second common electrode 770 and the pixel electrode 662 in order to drive the liquid crystal molecules 632. Thereby, the LCD panel 700 can have desirable liquid crystal efficiency. Namely, the liquid crystal molecules 632 of this embodiment are arranged in parallel to the first and the second substrates 610 and 620 and are affected by at least two electric fields for display.

Figure 8:
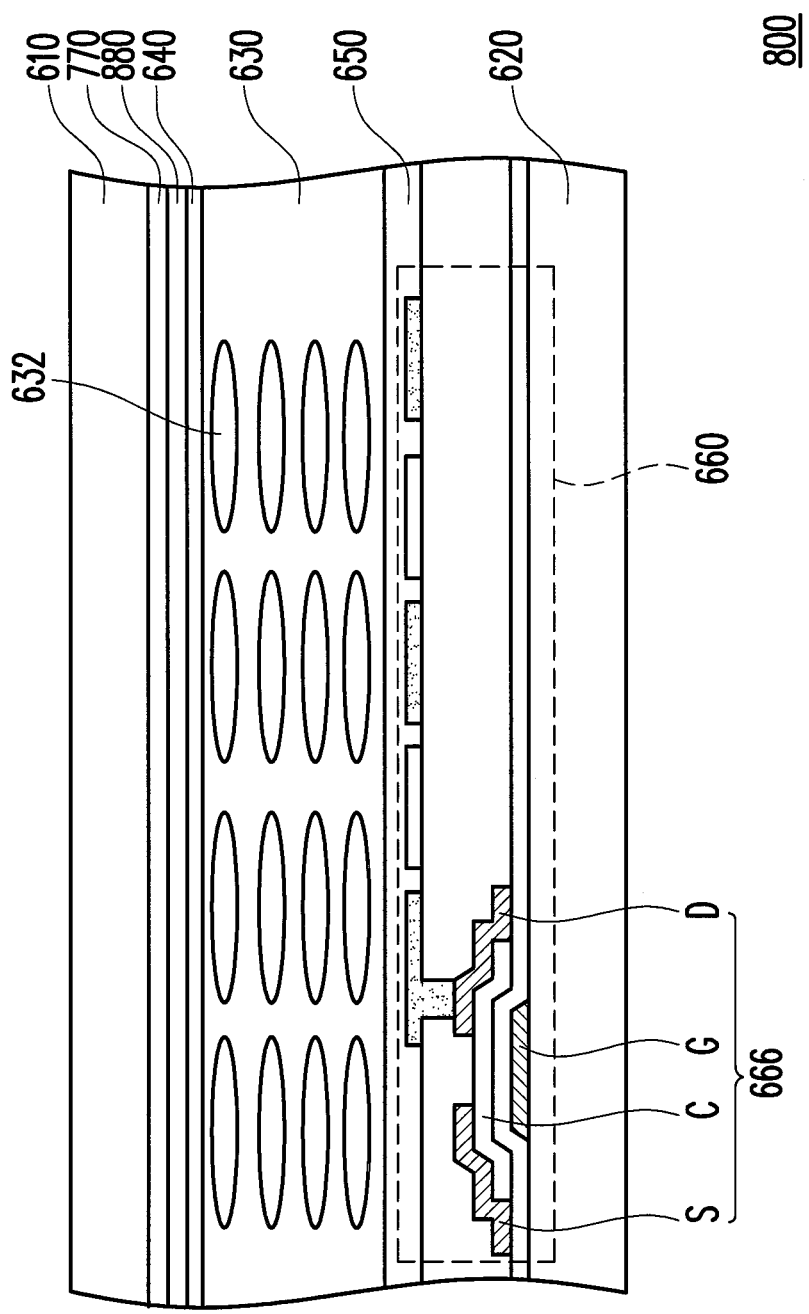
FIG. 8 is a schematic cross-sectional view illustrating a portion of an LCD panel according to an eighth embodiment of the invention.

FIG. 8 is a schematic cross-sectional view illustrating a portion of an LCD panel according to an eighth embodiment of the invention. With reference to FIG. 8, the LCD panel 800 has the components of the LCD panel 700 and further includes a planarization layer 880 that is configured between the first substrate 610 and the first alignment layer 640. To be more specific, the second common electrode 770 is located between the first substrate 610 and the planarization layer 880. The configuration of the planarization layer 880 brings about favorable liquid crystal efficiency of the LCD panel 800. However, it is not necessary for the planarization layer 880 to cover the second common electrode 770 in this invention. In other embodiments of the invention, the planarization layer 880 can be selectively configured between the second common electrode 770 and the first substrate 610. In this embodiment, the alignment direction of the first alignment layer 640 is conducive to an increase in the response speed of the liquid crystal molecules 632, such that the LCD panel 800 can have favorable display performance.

According to an embodiment of the invention, the LCD panels 600, 700, and 800 can further include a color filter layer (not shown) respectively to achieve the multi-color display effect. The color filter layer (not shown) can be selectively configured on at least one of the first substrate 610 and the second substrate 620. The second alignment layer 650 can selectively have an alignment direction (not shown) parallel to the first alignment direction of the first alignment layer 640. The way to define the alignment directions of the alignment layers is not specifically limited in the invention. Namely, rubbing alignment or photo-alignment are both applicable.

In light of the foregoing, the PSA process can be performed to the LCD panel of the invention, such that the liquid crystal molecules can be arranged in parallel to the substrates, and that the PSA liquid crystal layer can be formed. As such, the anchor force provided by the alignment layers ensures that the liquid crystal molecules are constantly arranged in parallel to the substrates. On the other hand, the alignment directions of the alignment layers allow the liquid crystal molecules to have fast response speed. Thereby, the LCD panel 100 can have favorable display quality. Further, the common electrode can be selectively configured on the opposite substrate in this invention, so as to further increase the response speed of liquid crystal molecules.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A liquid crystal display panel comprising:
   a first substrate;
   a second substrate opposite to the first substrate;
   a polymer stabilized alignment liquid crystal layer configured between the first substrate and the second substrate, liquid crystal molecules of the polymer stabilized alignment liquid crystal layer being substantially arranged in parallel to the first substrate and the second substrate;
   a first alignment layer configured between the polymer stabilized alignment liquid crystal layer and the first substrate, the first alignment layer having a first alignment direction to align the liquid crystal molecules of the polymer stabilized alignment liquid crystal layer;
   a second alignment layer configured between the polymer stabilized alignment liquid crystal layer and the second substrate; and
   a plurality of pixel structures, each of the pixel structures having a pixel electrode and a first common electrode, the pixel electrode being configured between the second substrate and the second alignment layer and having at least one slit, the first common electrode being configured between the second substrate and the second alignment layer and overlapped with the at least one slit, wherein no matter in a display state or not, the liquid crystal molecules of the polymer stabilized alignment liquid crystal layer are arranged in parallel to the first substrate and the second substrate.

2. The liquid crystal display panel as claimed in claim 1, wherein the liquid crystal molecules of the polymer stabilized alignment liquid crystal layer are negative polymer stabilized alignment liquid crystal molecules.

3. The liquid crystal display panel as claimed in claim 1, wherein an included angle between the first alignment direction of the first alignment layer and a vertical direction of the at least one slit ranges from about 0 degree to about 20 degrees.

4. The liquid crystal display panel as claimed in claim 1, wherein an included angle between the first alignment direction of the first alignment layer and a vertical direction of the at least one slit is about 10 degrees.

5. The liquid crystal display panel as claimed in claim 3, wherein a second alignment direction of the second alignment layer is substantially parallel to the first alignment direction of the first alignment layer.

6. The liquid crystal display panel as claimed in claim 1, further comprising a second common electrode configured between the first substrate and the first alignment layer.

7. The liquid crystal display panel as claimed in claim 6, further comprising a planarization layer configured between the first substrate and the polymer stabilized alignment liquid crystal layer.

8. The liquid crystal display panel as claimed in claim 7, wherein the second common electrode is located between the planarization layer and the first substrate.

9. The liquid crystal display panel as claimed in claim 1, wherein each of the pixel structures further comprises an active device configured on the second substrate, and the pixel electrode is electrically connected to the active device.

10. The liquid crystal display panel as claimed in claim 1, wherein the first common electrode is configured below the pixel electrode, located between the pixel electrode and the second substrate, and electrically insulated from the pixel electrode.

11. The liquid crystal display panel as claimed in claim 10, wherein the first common electrode of each of the pixel structures comprises at least one bar-shaped portion, and each of the bar-shaped portions is located below one of the slits.

12. The liquid crystal display panel as claimed in claim 10, further comprising an insulating layer configured on the second substrate and located between the first common electrode and the pixel electrode.

13. The liquid crystal display panel as claimed in claim 1, wherein the first common electrode and the pixel electrode are substantially co-planar, the first common electrode of each of the pixel structures comprises at least one bar-shaped portion, and each of the bar-shaped portions is located in one of the slits.

* * * * *